United States Patent [19]
Cane et al.

[11] Patent Number: 5,765,173
[45] Date of Patent: Jun. 9, 1998

[54] HIGH PERFORMANCE BACKUP VIA SELECTIVE FILE SAVING WHICH CAN PERFORM INCREMENTAL BACKUPS AND EXCLUDE FILES AND USES A CHANGED BLOCK SIGNATURE LIST

[75] Inventors: David Cane, Sudbury; David Hirschman, Sharon, both of Mass.

[73] Assignee: Connected Corporation, Framingham, Mass.

[21] Appl. No.: 585,273

[22] Filed: Jan. 11, 1996

[51] Int. Cl.$^6$ ................................................. G06F 17/30
[52] U.S. Cl. ................ 707/204; 707/205; 707/101; 395/182.04; 395/180
[58] Field of Search ........................ 395/489, 601, 395/616, 404, 619, 621, 182.04, 181, 620, 180, 101; 380/4; 707/205, 204

[56] References Cited

U.S. PATENT DOCUMENTS

| | | | |
|---|---|---|---|
| 5,133,065 | 7/1992 | Cheffetz et al. | 395/575 |
| 5,163,148 | 11/1992 | Walls | 395/600 |
| 5,210,866 | 5/1993 | Milligan et al. | 395/182.04 |
| 5,239,647 | 8/1993 | Anglin et al. | 395/621 |
| 5,263,154 | 11/1993 | Eastridge et al. | 395/182.04 |
| 5,276,860 | 1/1994 | Fortier et al. | 395/575 |
| 5,276,865 | 1/1994 | Thorpe | 395/575 |
| 5,347,653 | 9/1994 | Flynn et al. | 395/619 |
| 5,357,607 | 10/1994 | Sathi et al. | 395/166 |
| 5,367,698 | 11/1994 | Webber et al. | 395/800 |
| 5,404,508 | 4/1995 | Konrad et al. | 395/600 |
| 5,416,840 | 5/1995 | Cane et al. | 380/4 |
| 5,448,718 | 9/1995 | Cohn et al. | 395/404 |
| 5,475,834 | 12/1995 | Anglin et al. | 395/619 |
| 5,479,654 | 12/1995 | Squibb | 395/600 |
| 5,497,483 | 3/1996 | Beardsley et al. | 395/180 |
| 5,513,314 | 4/1996 | Kandasamy et al. | 395/182.04 |
| 5,559,991 | 9/1996 | Kanfi | 395/489 |
| 5,574,906 | 11/1996 | Morris | 395/601 |
| 5,586,322 | 12/1996 | Beck et al. | 395/616 |
| 5,604,862 | 2/1997 | Midgely et al. | 395/182.04 |
| 5,649,196 | 7/1997 | Woodhill et al. | 707/204 |
| 5,659,743 | 8/1997 | Adams et al. | 707/205 |

OTHER PUBLICATIONS

Levy et al. "Incremental Recovery in Main Memory Database Systems", IEEE Transactions on Knowledge and Data Engineering, v4, n6. pp. 529–540, Dec. 1992.

*Primary Examiner*—Thomas G. Black
*Assistant Examiner*—Charles L. Rones
*Attorney, Agent, or Firm*—Weingarten, Schurgin, Gagnebin & Hayes LLP

[57] ABSTRACT

High performance backup of a computer system includes backing up changed portions of files and selectively choosing files for backup. Files are treated as a collection of blocks, and only those blocks which have changed since a previous backup are transmitted to a backup system. Prior to selecting blocks for backup, files are selectively chosen by excluding previously archived files such as commercial software, and excluding other non-critical applications and data based on, inter alia, commonality, modification date and a list of files which are already present in the backup system. Files may also be pre-loaded into a backup system in anticipation of their presence in the computer system to be backed up.

20 Claims, 8 Drawing Sheets

File Exclusion by Common Dates

LIST 902

| | | | |
|---|---|---|---|
| ARTICLE2 | DOT | 10-18-91 | 12:00p |
| CUSTOM | DIC | 10-07-95 | 1:13p |
| DCFAX | DOT | 10-06-95 | 10:00a |
| DECOMP | EXE | 10-21-91 | 12:00p |
| DIALOG | FON | 10-21-91 | 12:00p |
| DISSERT2 | DOT | 10-18-91 | 12:00p |
| EXHIBITA | DOT | 08-19-92 | 5:23p |
| GRAPHICS | DOC | 10-21-91 | 12:00p |
| HY_AM | LEX | 10-21-91 | 12:00p |
| HYPH | DLL | 10-17-91 | 12:00p |
| MACROCNV | DOC | 10-21-91 | 12:00p |
| MACRODE | EXE | 10-21-91 | 12:00p |
| NORMAL | OLD | 04-23-95 | 5:06a |
| NORMAL | DOT | 10-04-95 | 8:19p |
| NUPAPER | OLD | 03-06-93 | 8:43p |
| NUPAPER | DOT | 10-01-95 | 7:37p |
| SPEC | DOT | 06-08-93 | 9:52a |
| TH_AM | LEX | 10-17-91 | 12:00p |
| THES | DLL | 10-17-91 | 12:00p |
| WINWORD | HLP | 10-17-91 | 12:00p |
| WINWORD | INI | 10-07-95 | 5:02p |
| WINWORD | TXT | 10-09-95 | 8:38a |
| WWORD20 | INF | 03-25-92 | 11:17a | ← 904

903

LIST 905

| | | | |
|---|---|---|---|
| *HYPH | DLL | 10-17-91 | 12:00p |
| *TH_AM | LEX | 10-17-91 | 12:00p |
| *THES | DLL | 10-17-91 | 12:00p |
| *WINWORD | HLP | 10-17-91 | 12:00p |
| *ARTICLE2 | DOT | 10-18-91 | 12:00p |
| *DISSERT2 | DOT | 10-18-91 | 12:00p |
| *DECOMP | EXE | 10-21-91 | 12:00p |
| *DIALOG | FON | 10-21-91 | 12:00p |
| *GRAPHICS | DOC | 10-21-91 | 12:00p |
| *HY_AM | LEX | 10-21-91 | 12:00p |
| *MACROCNV | DOC | 10-21-91 | 12:00p |
| *MACRODE | EXE | 10-21-91 | 12:00p |
| WWORD20 | INF | 03-25-92 | 11:17a |
| EXHIBITA | DOT | 08-19-92 | 5:23p |
| NUPAPER | OLD | 03-06-93 | 8:43p |
| SPEC | DOT | 06-08-93 | 9:52a |
| NORMAL | OLD | 04-23-95 | 5:06a |
| NUPAPER | DOT | 10-01-95 | 7:37p |
| NORMAL | DOT | 10-04-95 | 8:19p |
| DCFAX | DOT | 10-06-95 | 10:00a |
| CUSTOM | DIC | 10-07-95 | 1:13p |
| WINWORD | INI | 10-07-95 | 5:02p |
| WINWORD | TXT | 10-09-95 | 8:38a |

HIGH PERFORMANCE BACKUP VIA SELECTIVE FILE SAVING WHICH CAN PERFORM INCREMENTAL BACKUPS AND EXCLUDE FILES AND USES A CHANGED BLOCK SIGNATURE LIST

FIELD OF THE INVENTION

The present invention relates generally to computer system data backup techniques, and more particularly to method and apparatus for improving backup speed and efficiency.

BACKGROUND OF THE INVENTION

Modern businesses often rely heavily on computers and computer networks (computer systems). Irretrievable loss of data in a business's computer system is thus undesirable. To prevent loss of data, computer systems are periodically backed up. Backup copies allow recovery of data in the event of a system crash, natural disaster, or operator error that causes data stored on the system to be destroyed or lost.

One problem associated with backing up computer systems is the speed of the process, i.e., the time required to execute a backup. Often either the backup media or the connection between the computer system and the backup media is limited to data transfer rates which are substantially slower than the speed of the system on which the data is stored. For example, when backing up a PC hard drive to a tape drive over a network, the network and tape drive are likely to be limiting factors in the overall speed of the backup. The cost per unit of storage media for the backed up data may also be significant. For these reasons there is a desire to reduce the amount of information sent to the backup media, while still retaining the capability to reconstruct all of the information that was on the computer system in a timely fashion.

One method to reduce transmission time for backup is known as "incremental backup." With this method, an initial backup is done of the entire contents of the computer system. For each subsequent backup, only those files which have been changed or created since the last backup are sent to the backup media for storing. Whether a file has changed is determined by simply comparing the date that the file was created or last modified with the date of the last backup. However, a faster and more efficient backup system and technique is desirable.

SUMMARY OF THE INVENTION

In accordance with the present invention, only portions of files which have changed or been added since a previous backup are backed up. Each file is conceptually divided into blocks of a predetermined size. The blocks are scanned to determine which blocks have changed or added since the previous backup. Those i blocks which have been changed are backed up. For a first time backup, every block will be new (added). However, in subsequent backups speed is improved and less storage space is required to backup changed and added blocks, in comparison to backing up changed and added files.

In further accordance with the present invention, predetermined file selection criteria can be used to further screen a system's files for backup purposes. Such file selection criteria may exclude files which are already present in a backup system, and thus avoid unnecessary duplication of files in the backup system (and the time required to back such files up). Other, non-critical or commercial software files may also be excluded. For example, a date-based file exclusion technique can be used to identify commercial software, such as excluding groups of files with identical or nearly identical file modification dates from backup. Also, groups of files can be required to have a predetermined minimum number of files before being excluded, and each group may be required to include at least one executable file before being excluded. Such selection criteria will typically be employed prior to selecting blocks for backup.

In further accordance with the present invention, compression and encryption techniques can be used in conjunction with the partial file backup technique to further improve backup speed, efficiency and security. Compression can be employed in a user system to compress data prior to transmission to a backup system. The resultant savings in transmission time and required storage media make the backup faster and more efficient. Also, security can be maintained by encrypting data prior to transmission, since the backup system will store only encrypted data.

One feature of the present invention is improved backup speed and efficiency, which is accomplished by backing up portions of files that have changed, rather than complete files'. Often only a portion of a large file is modified between backup operations. Computer systems that use the technique of the present invention reduce the amount of data stored during a backup of a system with such large files by backing up one or more blocks of the large files, rather than the entire files. Because less data is transmitted and stored, backup speed is increased and backup storage media is used more efficiently.

BRIEF DESCRIPTION OF THE DRAWING

Other features and advantages of this invention will be apparent from the following detailed description of the drawing, in which:

FIG. 9 further illustrates file selection.

DETAILED DESCRIPTION OF THE DRAWING

Figure 1:
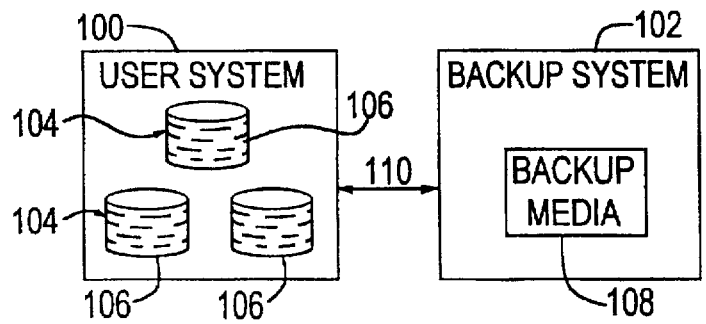
FIG. 1 is an overall computer system for high performance backup in accordance with the present invention.

Referring to FIG. 1, an overall computer system includes a user system 100, which is being backed up, and a backup system 102, which is executing the backup. The user system includes files 104 which may be present on any of various types of storage media 106 such as a hard drive. The backup system includes backup media 108, which may be any of various writable media known in the art. The user system and backup system are connected via a communications link 110.

The backup system may be physically close to the user system, or it may be quite distant. For example, the backup system may be a tape drive, the backup media a tape, and the user system one or more computers located in the same office and connected to the tape drive. Indeed, the user system and backup system could be the same computer, with a hard drive being the storage media and floppy disks or removable hard disks being the backup media. In contrast, the backup system may be located thousands of miles away from the user system, and the communications link may be an ordinary phone line. There are well known data throughput limitations associated with phone lines, due in part to limited bandwidth. The present invention helps to overcome throughput limitations and makes such a "dial-up" system more feasible by increasing backup speed. As a result, a single backup system may service a plurality of user systems, and thus relieve the user systems from having to execute backups. It will therefore be appreciated that the present invention provides improved backup which is independent of the devices which constitute the user system, backup system, storage media and backup media.

During backup, the user system 100 and the backup system 102 are in communication. Portions of files 104, including up to entire files, on the user system are selectively chosen for backup, and copied to the backup media. Portions of files can be selected for backup based on, e.g., the portions having been added or changed since the previous backup.

Figure 2:
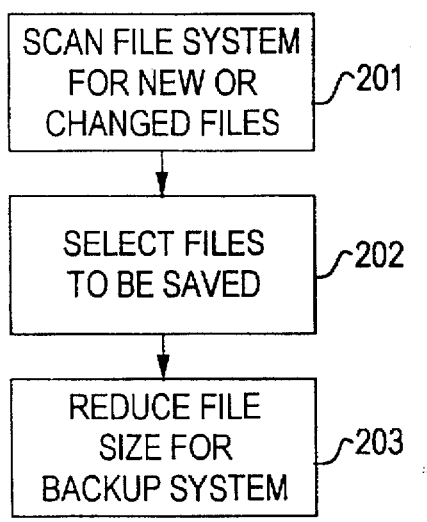
FIG. 2 is a macro view of an incremental backup operation for the system of FIG. 1.

FIG. 2 shows a macro view of an incremental backup operation for the overall system of FIG. 1. The operation includes three steps 201–203. In step 201, a scan of the user system 100 (FIG. 1) is performed to find files 104 (FIG. 1) which potentially need to be saved. Files which potentially need to be saved are files which were either modified or added since the last backup operation. Finding files which have been added or modified is a standard step of many known backup systems, and methods for performing step 201 are well known to those skilled in the art.

In step 202, files found in step 201 are selected for backup based on system defined criteria. Such criteria could be user alterable. Files not selected might include files whose loss would not be critical to the operation of the user system, or the business of the user.

In step 203, selected files remaining after step 202 are reduced in order to increase speed and efficiency of backup. Step 203 includes selecting which portions of the files have changed. By selecting only portions of files, size is reduced. The selected file portions are then backed up.

Figure 3:
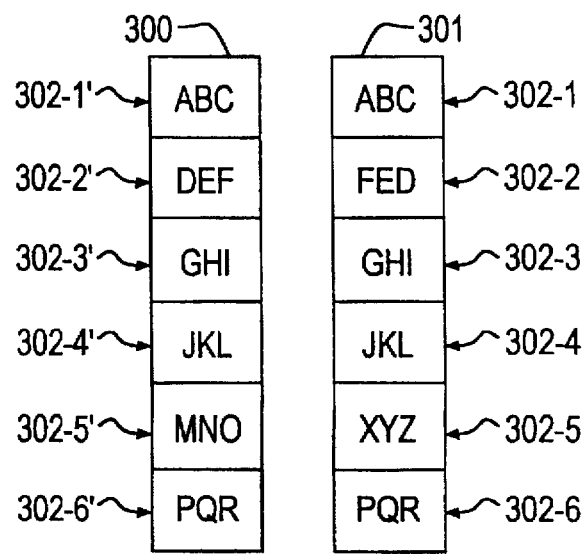
FIG. 3 is a more detailed illustration of the target files of step 203 of FIG. 2.

FIG. 3 illustrates step 203 of FIG. 2 with an exemplary target file 300, 301. The target file is shown at two different times in its history T1, T2, corresponding to 300, 301, respectively. Version T1 refers to the state of the target file at the time an initial system backup was performed, and Version T2 refers to the target file just prior to a second backup operation. The target file is conceptually divided into blocks 302-1, 302-2, 302-3, 302-4, 302-5, and 302-6 (marked for file 300) of a predetermined size from 1 Kbyte to 64 Kbytes, and typically 4 Kbytes. When selecting blocks of target file 301 for backup, the contents of each block, represented in FIG. 3 by three letter upper case strings (e.g. "ABC"), are checked for changes. In file 301, blocks 302-2 and 302-5 have changed from T1 to T2, while the other four blocks 302-1, 302-3, 302-4, 302-6 have not changed. Blocks 302-2 and 302-5 would therefore be selected for backup.

Figure 4:
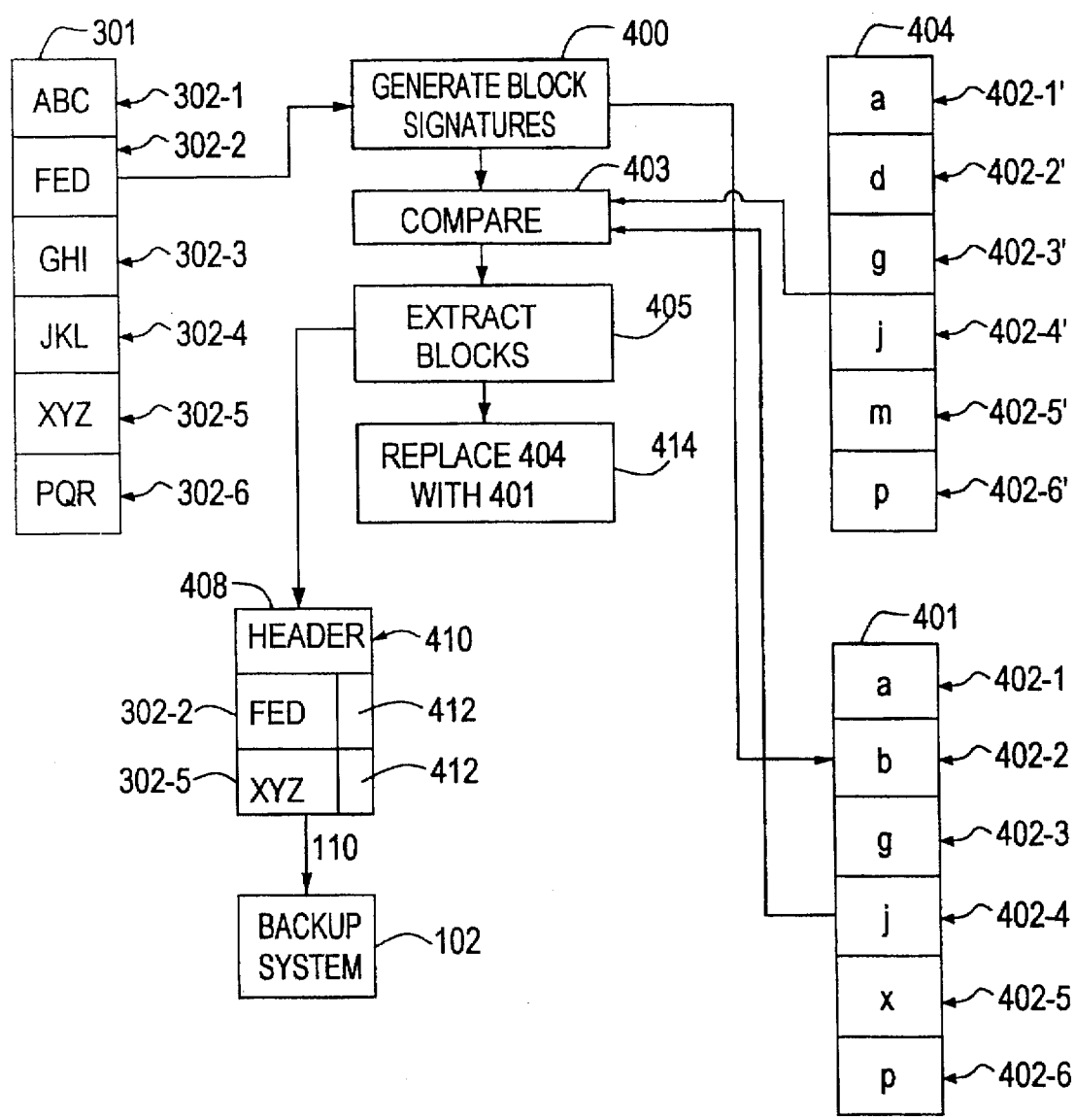
FIG. 4 further illustrates partial file backup.

FIG. 4 further illustrates step 203 of FIG. 2 with the exemplary target file 300, 301. In step 400, a block signature list 401 is created by computing a digital signature 402-1, 402-2, 402-3, 402-4, 402-5, and 402-6 corresponding to each block 302-1, 302-2, 302-3, 302-4, 302-5, and 302-6 respectively. The digital signature is a value (typically 4 to 16 bytes in size) which is computed by scrambling the bits of each block in a manner designed to produce a shorter value ("signature"), wherein the probability that the signatures of two different blocks will be equal is extremely small. Algorithms for generating signatures are well known in the state of the art, and include cyclic redundancy checks (CRC's) and message digests (including MD4 and MD5).

In step 403, blocks which have been changed are identified by comparing the block signature list 401 with a previously generated block signature list 404, which is the block list 401 from the previous backup. A block is considered to be changed if its signature has changed. Thus, block 302-1 would be considered changed if the signature 402-1 corresponding to the block is different than the signature 402-1' corresponding to the block from the previous backup. In the exemplary embodiment of FIG. 4, block 302-1 is unchanged, and would therefore be excluded from backup. Block 302-2 has changed, and would be selected for backup.

During an initial (first time) backup operation there will be no previous block signature list. In that case, a block signature list 401 is created to serve as the previous block signature list 404 in the next backup. Also, during initial backup steps 403 and 405 are skipped, and the target file is sent to step 414.

Assuming that this is not a first time backup, step 403 is followed by step 405. In step 405, all changed blocks (302-2, 302-5) that were identified in step 403 are extracted from their file 301 and packed into a changed block file 408. The changed block file includes a header 410 which identifies the original file 301, the changed blocks themselves 302-2, 302-5, and a value 412 indicating the location of each changed block in the target file 301. The header may include the name of file 301, and the value may be a tag indicating the sequential origin of the block in the file, i.e., first block, second block etc. The changed block file 408 is then transmitted over the link 110 to the backup system 102, where the changed block file 408 is stored. Finally, the previous block signature list 404 is replaced with the block signature list 401 in step 414.

Figure 5:
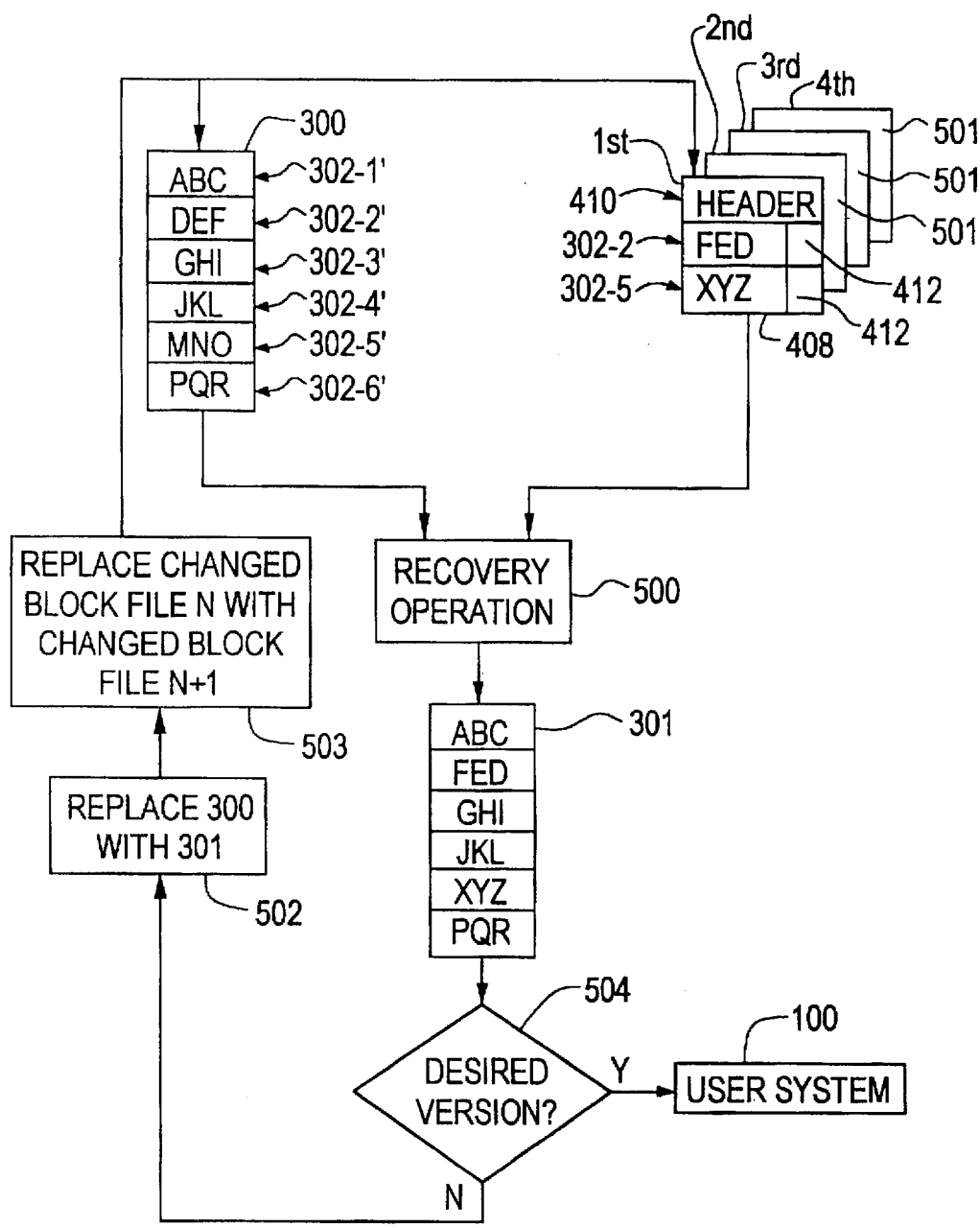
FIG. 5 illustrates recovery of files from the backup system.

FIG. 5 illustrates recovery of backed up files from the backup system. After two backup operations have been performed as described above, the backup system holds the version T1 target file 300 and the version T2 changed block file 408 for the version T1 target file 300. When a recovery operation is requested, a complete version T2 target file 301 is recovered in a recovery step 50 by reading the changed block file 408, and replacing corresponding blocks in the original target file 300 with the blocks from the changed block file 408. The changed block file is matched to the target file 300 with the information in the header 410, e.g., the file name. Each changed block is then substituted for corresponding blocks in the target file 300 using the value 412 to indicate the location at which to begin substitution of each block. In the exemplary illustration, block 302-2 is substituted for block 302--2 and block 302-5 is substituted for block 302-5'. The recovered file 301 is then sent to the user system 100.

The recovery step 500 can be employed to restore the target file as that file existed at any of various points in time. The system also holds each previous (intermediate) changed block file 501. If "N" backups have been conducted, N-1 changed block files 501 will exist for versions T2 through TN of the target file. A "most recent" version of the recovered file can be created by applying the operation of step 500 recursively for each changed block file 501 in the order in which the changed block files were generated. Each time through file 300 is replaced with file 301 in step 502, and the changed block file is replaced with the next most recent changed block in step 503. Versions of the target file from various points in time can be provided by stopping the process in decision block 504 when the desired version is produced.

Figure 6:
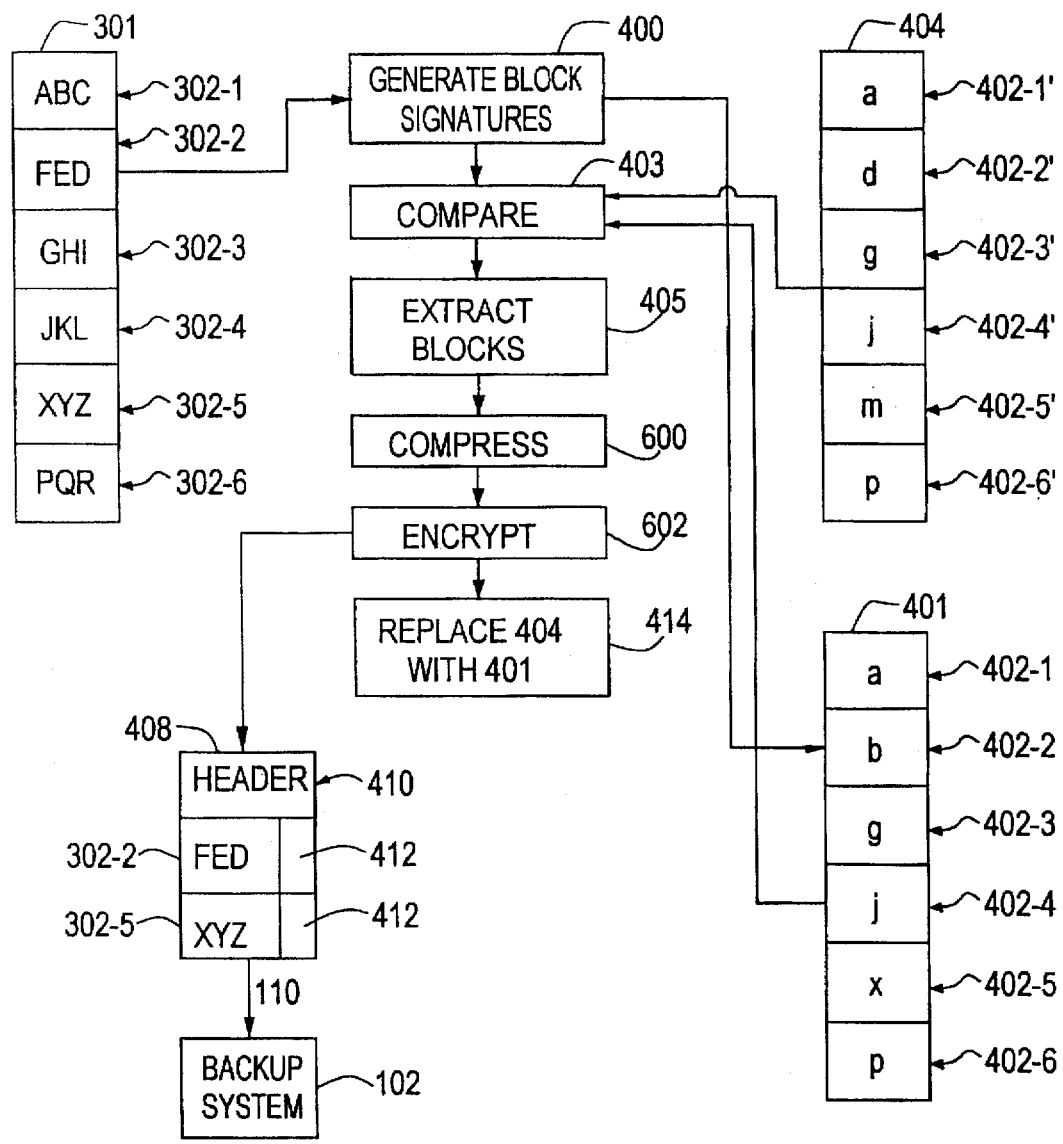
FIG. 6 illustrates alternative file backup techniques.

Turning to FIG. 6, in an alternative embodiment either or both encryption and compression can be used to further speed backups and reduce the amount of storage media required for backup. In this embodiment, step 405 is followed by step 600 rather than steps 414 and 408. In step 600, the changed block file is compressed using conventional compression methods. Possible compression methods include sliding window, dictionary based, and frequency analysis methods (or combinations of all three) and are well known to those versed in the art. When used in conjunction with the partial file method described here, it is desirable for performance reasons that the compression method be applied to each block 302 separately, so that a given block may be extracted from the compressed file without the need to decompress the entire file. The compression step 416 produces compressed blocks, which will ordinarily be smaller than uncompressed blocks.

In step 602, the compressed blocks from step 600 are encrypted to provide security for the backed up data during transmission, and also in the backup system. Cryptographic techniques suitable for encrypting the blocks are well known in the art. It is desirable for performance and security considerations that the encryption of the file 301 be carried out in such a way that each of the original blocks may be extracted from the file without the need to decrypt the entire file. It is thus desirable that each block be compressed and encrypted separately.

After being compressed and encrypted, the changed blocks are placed in the changed block file 408, and transmitted to the backup system. Alternatively, the entire changed block file could be compressed and encrypted prior to transmission. In step 414, as already described, the previous block signature list 404 is replaced with the newly created block signature list 401.

If the steps of compression and/or encryption are used in the backup process, the target file produced from this process is not the original target file, but rather a target file in which each block has been compressed and/or encrypted. The user system can then recreate the original file 301 through the processes of decryption and decompression.

Figure 7:
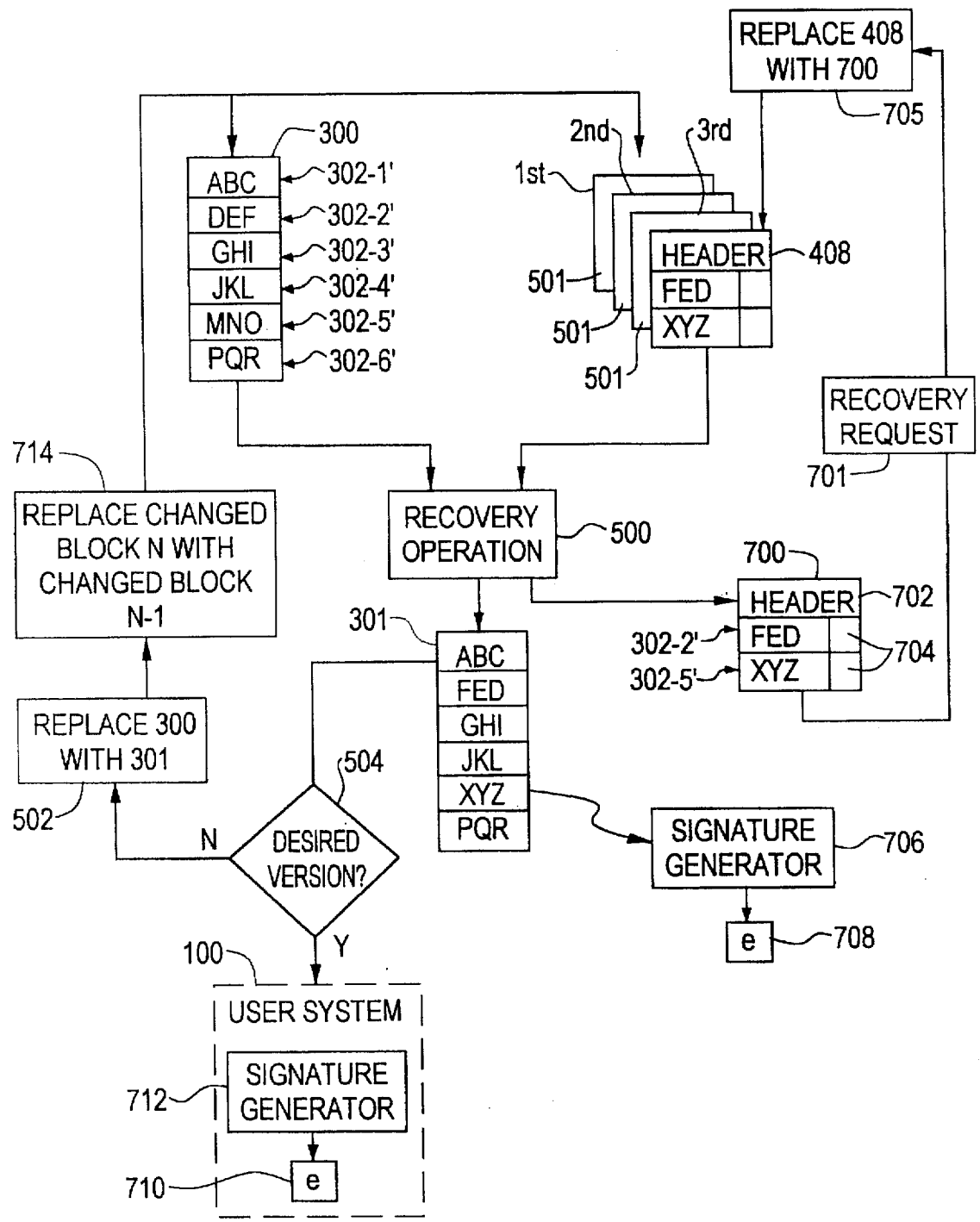
FIG. 7 illustrates alternative recovery techniques.

In a second alternative embodiment illustrated in FIG. 7, the invention provides improved ease of recovery of a most recent version of file 301. The most recent version of a file is probably the one most likely to be required in a typical file recovery operation. A variation of the recovery process described above can reduce the time required to provide the most recent target file when recovery is requested from the user system.

In this embodiment, recovery step 500 is performed whenever a changed block file 408 is received at the backup system i.e. during each normal backup. This produces a target file 301 as described above, but also produces a version T1 changed block file 700. When target file 301 is produced, the blocks that were replaced from the target file 300 are saved in changed block file 700 along with a header 702 which identifies the file 300, 301 and values 704 which indicate the position of each block in the file. Changed block file 7.00 thus contains all changes "to-date" from a base backup such as the first backup (here file 300). When a recovery request 701 for file 301 arrives, the request is quickly satisfied by replacing changed block file 408 with changed block file 700 in step 705, and updating file 300 with the changed block file 700. The resultant file 301 is transmitted to the user system. This technique decreases the time required to provide the target file to the user system since recursive updating is avoided.

The technique also retains the functionality of the previously described embodiment because the target file can be recreated as it existed at any of various points in time by recursive updating or de-updating. When a request 701 to recover a target file of N+1 vintage is received, target file 300 can be recursively updated by replacing changed block files in step 714, and cycling as described above, or the fully updated file 301 can be de-updated by replacing changed block files in step 714 in reverse chronological order, and cycling as described above until the desired target file is recovered. To de-update, the file 301 is updated with the previous changed block file (here N+2) to produce an intermediate file which is recursively updated (next with changed block file N+1) until the desired version is reached. The changed block files may be applied to provide the re-creation of any past version.

Another alternative embodiment allows improved error checking of the backup process. In step 706, a signature 708 is produced for the entire reconstructed target file 301. The signature 708 is compared to a signature 710 generated in a signature generator 712 on the user system 100. The signatures 708, 710 are compared for the current version of the target file, and are used to verify that the entire backup and reconstruction process did not introduce errors. If compression and encryption are used, then the user system generates a signature on the target file after compression and encryption have been performed there.

Figure 8A:
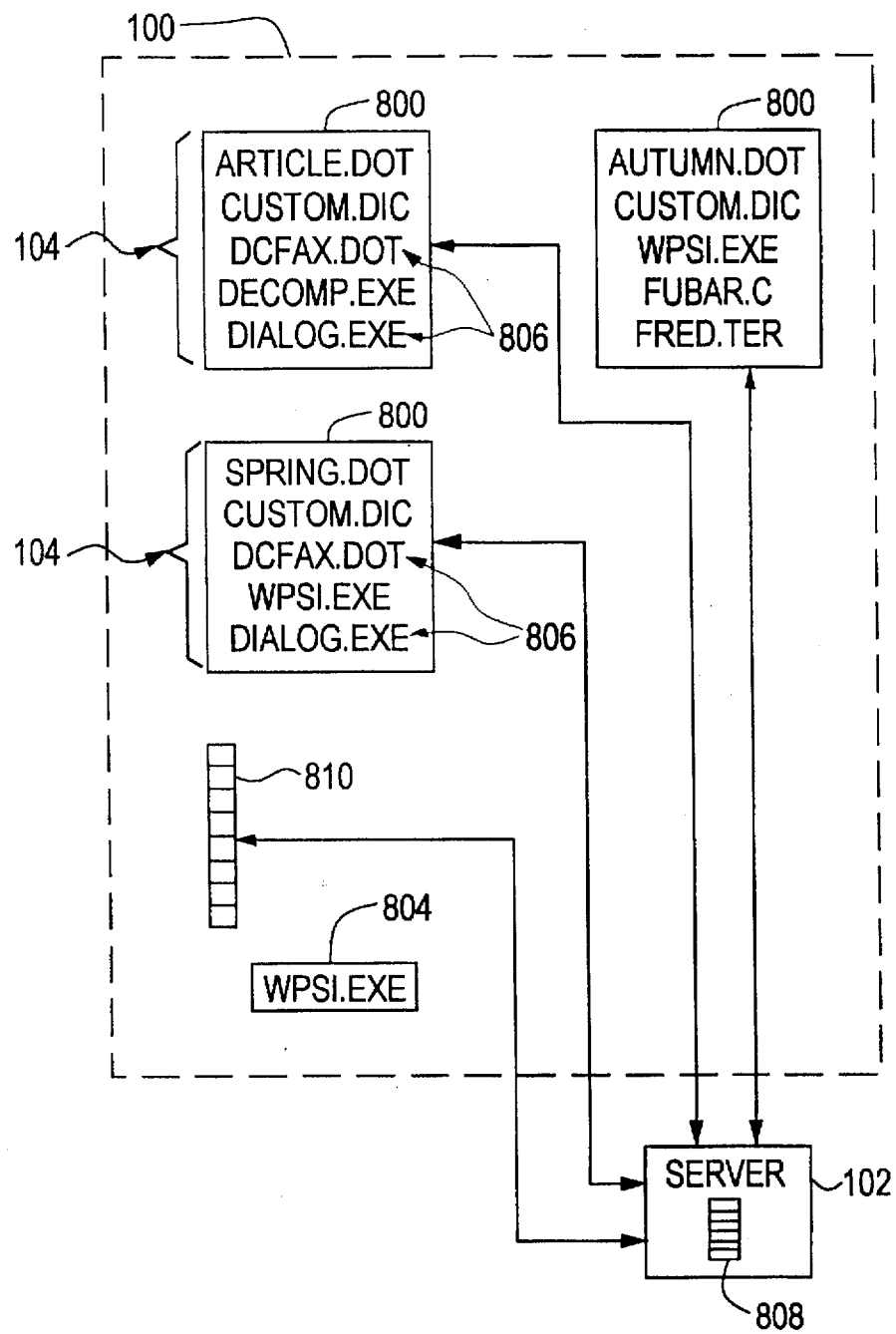
FIGS. 8A and 8B illustrates file selection.

In a another alternative embodiment illustrated in FIG. 8A, improved file selection criteria are provided. For example, exclusion of common files can be used to further reduce the amount of data transmitted and backed up. Some user systems 100 will share a common backup system 102. This will be true, for example, when the user systems are personal computers (PCs) 800 and the backup system is some form of server. Many of the files 104 on the PCs are likely to be from commercial software products or similar things, for which case the user already has an archival copy (file) 804 on some other form of media, typically diskette or CD-ROM. In such a scenario, the time and expense required to send previously archived files 804 to the backup system 102 may be unjustifiably high for the user. It is therefore desirable to selectively and intelligently choose files which are to be backed up. Such choosing can be accomplished by recognizing commercial software and other redundant files and backing those files up only one time. More particularly, selection is based on which files are already present on the backup media, regardless of where such files appear in the user system. Thus, in step 202 (FIG. 2) archived files 804 would be excluded from backup and files 806 common to more than one PC 800 would be selected only once (excluded when encountered a second time).

To utilize this selection criteria, a scan of the user system 100 is made and a list 808 of files that are candidates for saving are identified. The user system also contains a list 810 of common files present on the backup system. This is sent to the user system 100 periodically by the backup system 102. The candidate save list 808 is compared against this common file list 810 and any files that are found are marked as being already present on the backup system. Files not so marked are sent through the normal backup process as previously described. Files already present on the backup system bypass this process, and only file identification is sent to the backup system, not the actual file itself. When the user system request recovery of such a file, the backup system pulls the file from the common file pool and sends it to the user system.

Figure 8B:
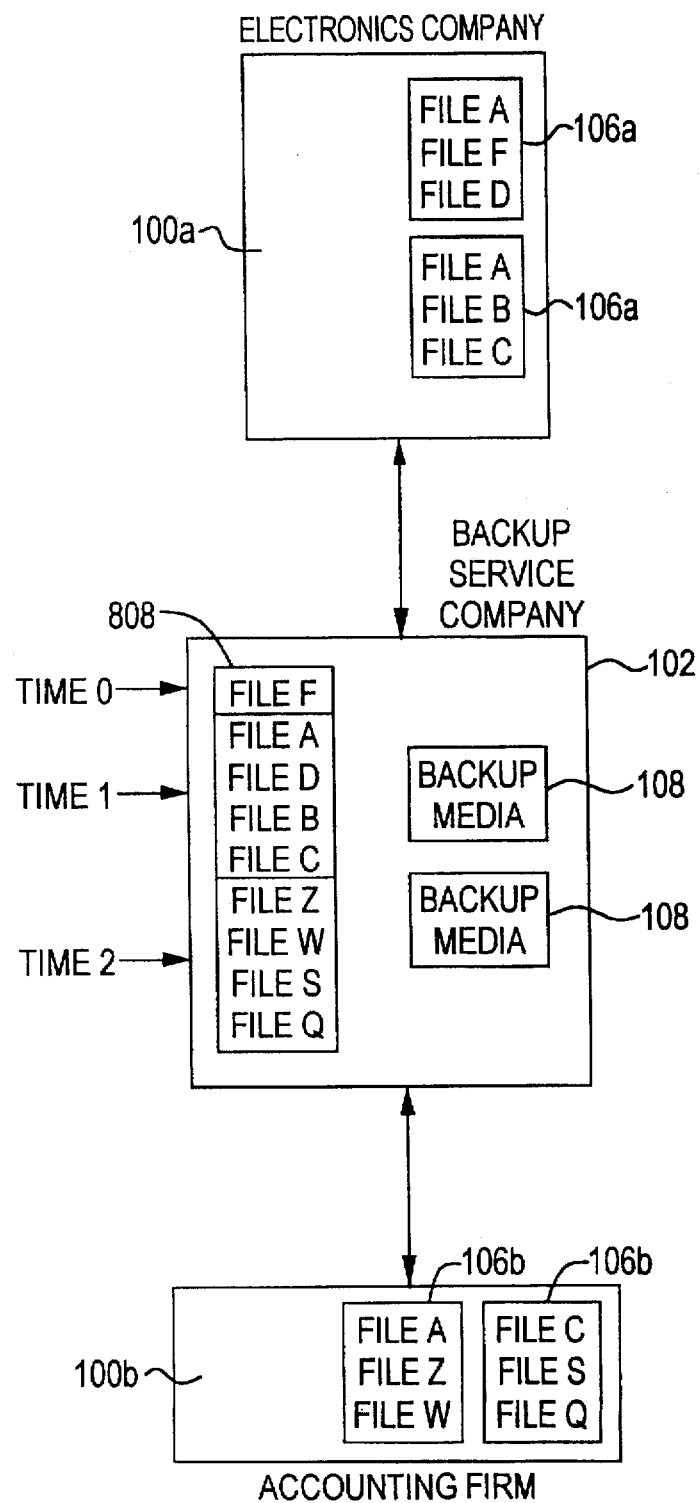

File selection is further illustrated for another possible embodiment in FIG. 8B. While FIG. 8A illustrates file selection in a local area network type environment, the selection technique is equally applicable to other embodiments including a single computer and, as shown in FIG. 8B, a remote backup service. Here, the backup system 102 is run by a backup service company which provides backup service for various, unassociated user systems 100a, 100b, used for example by an electronics company and an accounting firm. Assuming neither system 100a, 100b has been previously backed up by the backup system 102, the backup system list 808, which may be stored anywhere, may include some files, e.g., File F, as shown at Time 0. When the backup system connects to user system 100a to perform a backup, a scan is made for files which appear more than once in the user system, such as File A, and the backup system excludes any additional copies (after the first copy) from backup. The backup system also scans the user system for files which are already present in the backup system. Here, File F is already present in the backup system, and File F is therefore excluded from backup. Remaining files A, B, C, D are then backed up, and the list 808 is updated. After backing up user system 100a, the list 808 includes the Time 0 files and the Time 1 files. When the backup system connects to user system 100b for backup, scans are made as described above. Here, there are no redundant files within user system 100b itself, but File A and File C are already present in the backup system. File A and File C are therefore excluded from backup. Following backup of user system 100b, the list includes files from Time 0, Time 1, and Time 2. The same routine is used for subsequent backups, and backups of other user systems. Certain files may even be preloaded into the backup system in anticipation of the appearance of such files in user systems. A record of where duplicate, excluded files appeared in each user system is made for use when restoring a user system.

As illustrated in FIG. 9, files can also be excluded based on modification date. If a user does not wish to backup commercial software, the selecting step 202 (FIG. 2) may be modified to automatically identify purchased software and exclude it from the list of files to be saved. This can be done by taking advantage of the fact that for most purchased software packages all of the files within the package have identical (or nearly identical) file modification times. This is a circumstance that does not typically occur with files that are created by users. Assurance that common modification times indicate commercial software files may be enhanced by requiring that one of the files within a common date pool be an executable file. A requirement that the files be in a single directory may also be used.

In step 201 (FIG. 2), a scan is made of all the files in the user system's file system to produce a list of files not present at the time of the last backup. This list is created so that all files within a given directory are kept together. List 902 shows a portion of a list for a single directory 903. List 902 is sorted so that within each directory 903, files are sorted by date 904 of their last modification to provide a sorted list 905. The sorted list is then analyzed such that whenever a predetermined number of files (e.g., 6) is found to have identical or almost identical file modification dates, the files are excluded from the list of files to save. Such files are shown in list 905 as being marked with an asterisk.

A further selection criteria can be used for files which are nearly common and have nearly the same modification date, but for which multiple backup copies are unnecessary. A typical example of such files would be executables of commercial software packages present on multiple PCs in a user system, to which patches have been added. The patches might include the PC user's names, for presentation on an introductory screen but the files are otherwise identical. Accordingly, these files can be identified and, apart from the individual patches, backed up only once. Such files can be found with techniques already described, such as scanning for groups of files with similar modification dates and which are executable. File name and size may also be used since patch size is relatively small. Once located, the files can be conceptually separated into blocks selected for backup. Alternatively, only the specific lines of the patch could be separated. Further, the files could be disregarded.

It should be understood that the invention is not limited to the particular embodiments shown and described herein, and that various changes and modifications may be made without departing from the spirit and scope of the present invention as defined by the following claims.

What is claimed is:

1. A method for backing up a user system having one or more storage media to a backup system with a backup media, the user system being in communication with the backup system, where at least one previous backup has been made including storing a version T1 target file in the backup system, the method comprising the steps of:

determining which files are present in the backup system;

defining a critical file selection criteria to identify files within the scope of backup;

defining a list of unique file identifier descriptors to specifically identify files already stored on said backup system;

excluding from backup those files which are already stored in the backup system, whereby a file which is common to two or more storage media is backed up only once; and wherein said excluding is based on comparing files to said list of unique file identifier descriptors;

determining from said user system storage media target files which have changed since the previous backup;

selecting target files which have changed since the previous backup;

eliminating, from said group of target files, entries which are not within the range of files included in said critical file selection criteria;

transmitting the particular selected target file from the user system to the backup system; and storing the changed files on the backup system.

2. The method of claim 1 wherein said reducing step further includes computing a digital signature for each block.

3. The method of claim 1 further including producing a reverse changed block file by performing a recovery operation to a target file along with each backup, said recovery operation resulting in a "most recent" version of the target file and said reverse changed block file, said reverse changed block file storing changes to said "most recent" file such that said target version; is reconstructed by updating the "most recent" version target file with said forward changed block file.

4. The method of claim 3 wherein earlier versions of the target file are produced by recursively de-updating the most recent version target file with said reverse changed block files.

5. The method of claim 4 further including restoring a desired version of the target file in the backup system and transmitting the desired version of the complete target file to the user system.

6. The method of claim 5 wherein a digital signature of said desired version target file is computed in said backup system and transmitted to said user system, and a digital signature of the received desired version target file is computed in the user system and compared with the received digital signature to verify accuracy of said restoring step.

7. The method of claim 1 further including excluding files which are part of a commercial software program, said commercial software program files being identified by scanning for files with similar file modification dates.

8. The method of claim 7 wherein said scanning for files with similar file modification dates includes considering only files located in a discrete and enumerable location and sub-directories thereof.

9. The method of claim 8 wherein said scanning for files with similar file modification dates includes considering only groups of files with a predetermined minimum number of files.

10. The method of claim 9 wherein said scanning for files with similar modification dates includes considering only groups of files wherein at least one file in the group contains computer instructions.

11. The method of claim 1 including recognizing files which contain computer instructions, and which have differing patches, wherein a patch distinguishes instantiations of similar applications by comprising non-instruction data areas and excluding such files from backup.

12. The method of claim 11 further including recognizing files which contain computer instructions, and which have differing patches, and backing up only the patches.

13. The method of claim 1 wherein said selecting files as candidates for backup further includes excluding groups of files with common modification dates.

14. The method of claim 13 wherein said groups of files are required to contain a predetermined minimum number of files before being excluded from backup.

15. The method of claim 14 wherein each said group of files is required to contain at least one file which contains computer instructions before said group is excluded from backup.

16. A computer system with improved backup and restoration capability comprising:

a user system having one or more storage media with files, said files having attributes and said user system having ability to make changes to said files;

a backup system having backup media, said backup system connected to said user system by a link, said backup system having a version T1 target file and at least one changed block file, said changed block file comprising enumeration of said changes to said files on said storage media, said link having ability to transport said changed block files; said backup system having a changed block signature list from a previous backup;

a new changed block signature list created during backup, and wherein said new list is compared to said previous list to identify changed blocks;

a forward changed block file created from said identified changed blocks for each selected changed file in said user system wherein said forward changed block files are transmitted from said user system to said backup system;

said version T1 target file updated with said forward changed block files in said backup system to produce a desired version file which is transmitted to the user system during a recovery operation;

a digital signature of the desired version file is computed independently in both said user system and said backup system, and the signatures are compared to verify error-free transfer;

a subset of said files on said user system excluded from backup prior to generating said new changed block signature list, said subset comprised of files for which alternate backup copies exist; and a list which indicates files already present in said backup system, copies of said already present files in said user system being excluded from backup.

17. The computer system of claim 16 where files with identical modification dates are excluded.

18. The computer system of claim 17 wherein said files with common modification dates are selected from common directories, and subdirectories thereof, and arranged in groups, said groups required to include a predetermined minimum number of files and include at least one file having computer instructions before any file in the group is excluded from backup.

19. The computer system of claim 18 wherein said forward changed block files are compressed prior to being transmitted.

20. The computer system of claim 19 wherein said forward changed block files are encrypted prior to being transmitted.

* * * * *